June 21, 1966 R. DENK ETAL 3,256,793
PHOTOGRAPHIC STRUCTURE, PARTICULARLY FOR MOTION PICTURE CAMERAS
Filed Dec. 27, 1963 3 Sheets-Sheet 1
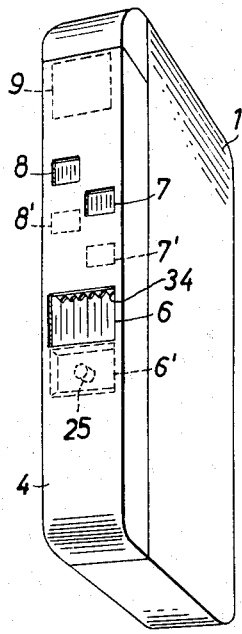
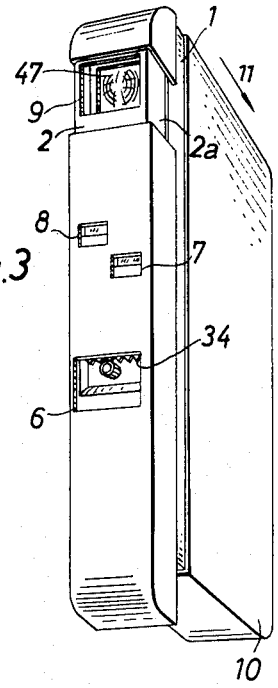
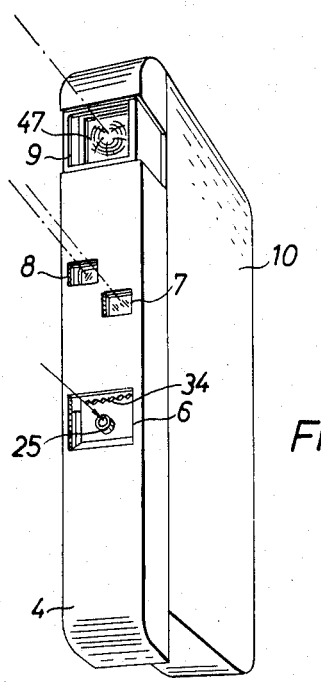
INVENTORS
RICHARD DENK
HANS GUGELOT
HANS SUKOPP
ERNST REICHL
BY Michael S. Striker
Atty June 21, 1966   R. DENK ETAL   3,256,793
PHOTOGRAPHIC STRUCTURE, PARTICULARLY FOR MOTION
PICTURE CAMERAS
Filed Dec. 27, 1963   3 Sheets-Sheet 2

INVENTORS
RICHARD DENK
HANS GUGELOT
HANS SUKOPP
ERNST REICHL
BY Michael S. Striker

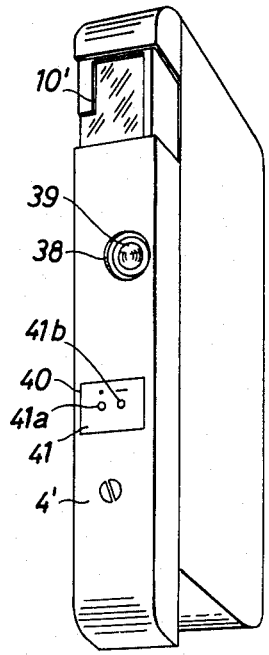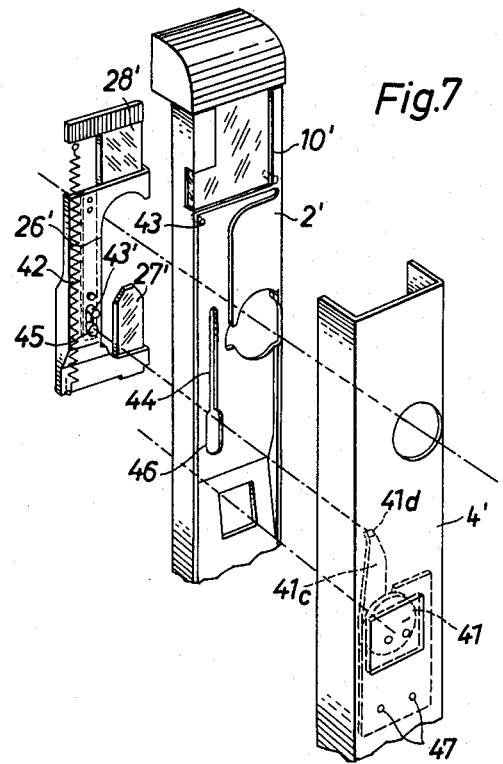

United States Patent Office 3,256,793
Patented June 21, 1966

3,256,793
PHOTOGRAPHIC STRUCTURE, PARTICULARLY FOR MOTION PICTURE CAMERAS
Richard Denk, Munich, Hans Gugelot and Hans Sukopp, Ulm (Danube), and Ernst Reichl, Obereichingen, Germany, assignors to Agfa Aktiengesellschaft, Leverkusen, Germany
Filed Dec. 27, 1963, Ser. No. 333,962
Claims priority, application Germany, Jan. 19, 1963, A 19,417
17 Claims. (Cl. 95—11)

The present invention relates to cameras.

Although the art of photographic cameras is of course very highly developed, there are still many problems which are encountered, and one of these is the ease with which access may be had to the interior of a camera. At the present time, for example, it is necessary to provide cameras with walls at the exterior which must be separately removed in order to give access to the interior of the camera, and of course this represents a considerable inconvenience. Moreover, many cameras are adapted to be used, depending upon the circumstances, with filters, and here again there is a considerable inconvenience involved in conventional arrangements which enable filters to be moved to and from positions where they will control the light which passes into the camera.

It is accordingly a primary object of the present invention to provide a camera construction which makes it very easy to have access to the interior of the camera without in any way requiring separate wall members to be unscrewed, for example, so that it is possible with the structure of the invention to have access quickly and easily to any desired part of the camera.

It is furthermore an object of the present invention to provide a structure which includes a removable camera cover but which also includes a locking structure which holds the camera cover in position, and in particular it is an object of the invention to provide a safety arrangement which prevents inadvertent unlocking of the camera cover.

It is furthermore an object of the present invention to provide a structure which when a part of the camera is set into a position to enable the camera to be operated will reliably prevent this part of the camera from being moved to a position preventing operation of the camera unless the operator actually wishes to have the part so moved, so that in this way inadvertent actuation of parts which might prevent proper operation of the camera is reliably avoided.

Also, it is an object of the present invention to provide a camera construction where filters can be quickly and easily displaced from inoperative positions into operative positions where they will be in the path of movement of light into the camera, and in particular it is an object of the invention to make it very simple and easy for the operator to control whether or not a filter will be in an operative position.

With the above objects in view the invention includes, in a camera, a support means which is capable of carrying and which in fact does carry almost all of the camera components, and a rear cap which is shiftably carried by the support means for movement to and from a closed position where the rear cap covers all of the camera except a front portion thereof where a front cap is located for shifting movement between operative and rest positions. This rear cap can be removed from its closed position so as to give access to substantially all of the camera, and the rear cap is open only at its front end where it adjoins the front cap, so that in this way the camera is reliably closed and covered by the rear cap at all portions except the front portion of the camera where the front cap is located. A lock means will releasably lock the rear cap in its closed position, and in accordance with a further feature of the invention in order to release the lock means it is necessary to move the front cap from its rest position through and beyond its operative position to a release position where a structure which moves with the front cap will actuate the lock means to release the cover, so that in this way the rear cap or cover cannot be inadvertently removed, and in addition, in accordance with a further feature of the invention, when the front cap is in its operative position a structure whch is operatively connected to the front cap will releasably hold it in this operative position until the operator postively manipulates this structure to release the front cap for movement away from its operative position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 shows one possible embodiment of a camera according to the present invention with the front cap thereof in its rest position so that the camera is shown in FIG. 1 in a condition where it can be safely transported;

FIG. 2 shows the camera of FIG. 1 with the front cap displaced downwardly to an operating position in which the camera is in a condition for making exposures;

FIG. 3 is a perspective illustration again of the camera of FIG. 1 but with the front cap displaced downwardly beyond the operating position of FIG. 2 to a release position which enables the rear cap to be removed;

Figure 4:
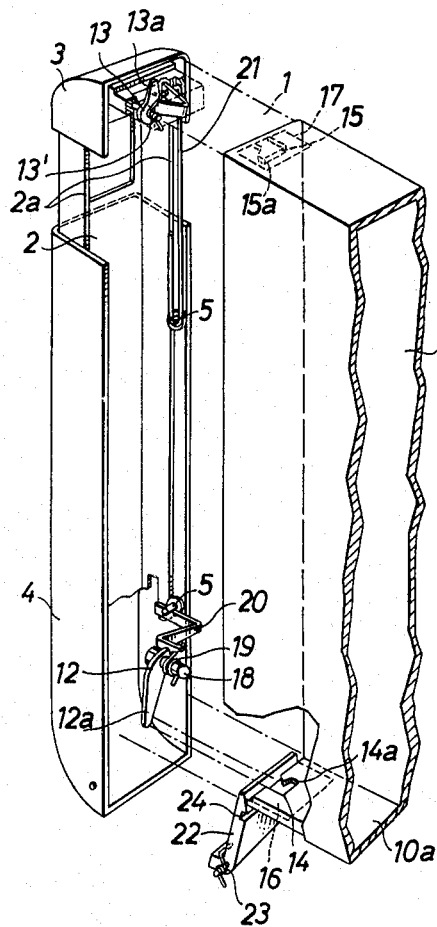
FIG. 4 is a fragmentary perspective illustration showing the details of the locking means which releasably locks the rear cap in its closed position, FIG. 4 also showing a releasable holding means which releasably holds the front cap in the operating position of FIG. 2.

FIG. 6 is a perspective view of another embodiment of a camera according to the present invention, the front cap of the camera of FIG. 6 being shown in FIG. 6 in its operating position where the camera is ready to make exposures; and FIG. 7 is a fragmentary perspective exploded view of a filter assembly and construction for controlling the same, this structure of FIG. 7 being used with the embodiment of FIG. 6.

Although the structure described below and shown in the drawing relates to motion picture cameras, it will be apparent that the principles of the invention are fully applicable to other types of cameras.

Referring now to the drawings, there is indicated in FIGS. 3 and 4 a support means 1 in the form of a suitable frame which carries substantially all of the components of the camera. The support means includes at the front portion of the camera an elongated frame 2 of channel-shaped configuration having a substantially U-shaped cross section, and at its upper end the frame 2 carries a corner cap 3 which is fixed to the support means and which has side walls which have the configuration of a quarter of a circle, with the remaining wall curved in the manner shown in the drawings. The support means, at its front frame 2, also serves to support a front cap 4 of the camera, this front cap 4 also being of an elongated channel-shaped configuration and receiving in its interior the channel 2, the cap 4 having a sliding fit on the frame 2 which extends into the interior of the cap 4. The side walls of the cap 4 fixedly carry pins 5 which extend across and engage the rear free edges of the side walls 2a of the frame 2, so that in this way the pins 5 cooperate with the walls 2a for guiding the front cap 4 for vertical sliding movement on the support means of the camera, and it will be noted that the front cap 4 at its bottom end portion has a configuration matching that of the cap 3, so that the upper and lower corners of the camera, particularly when the cap 4 is in the rest position of FIG. 1, will be symmetrically curved, as is apparent from the drawings.

The front cap 4 is formed with openings 6, 7 and 8 which in the operating position of the cap 4, illustrated in FIG. 2, are respectively in alignment with openings 6', 7' and 8' which are formed in the frame 2. The objective of the camera is located behind the opening 7' of the frame 2 and the viewfinder of the camera is located behind the opening 8', so that when the cap 4 has been shifted downwardly to the operating position of FIG. 2, from the rest position of FIG. 1, light will pass through the objective and the viewfinder of the camera. It will be noted that when the cap 4 is in its rest position of FIG. 1 the openings 6–8 are respectively out of alignment with the openings 6'–8', so that these latter openings are covered by the cap 4 when the latter is in its rest position of FIG. 1. The frame 2 is formed at an upper portion thereof with an opening 9 behind which is located an exposure-controlling means 47 which in a known way responds to the light for automatically setting the diaphragm of the camera according to the lighting conditions, and the entire opening 9 is located above the cap 4 when the latter has been displaced downwardly to the operating position of FIG. 2, so that in the operating position of the cap 4 light will also reach the structure 47 for automatically setting the diaphragm of the camera, and it will be noted from FIG. 1 that the opening 9 is also covered by the cap 4 when the latter is in its rest position.

It is to be noted that the top edge of the cap 4 adjoins the bottom edge of the cap 3 when the cap 4 is in its rest position, so that in this way the caps 3 and 4 serve to cover the entire front portion of the camera when the cap 4 is in its rest position, and the camera also includes a rear cap 10 which, when in its closed position, shown in FIGS. 1 and 2, has a front edge extending all around the camera and adjoining the rear edges of caps 3 and 4, so that the caps 3, 4 and 10 serve to completely cover the entire camera when the cap 4 is in the rest position of FIG. 1. This cap 10 is in the form of a hollow shell which is open only at its front end where the cap 10 has an endless front edge extending all around the camera and adjoining the caps 3 and 4, and the support means 1 supports the cap 10 for shifting movement to and from the closed position illustrated in FIGS. 1 and 2. The cap 10 is shiftable in the direction of the arrow 11 of FIG. 3 rearwardly away from the caps 3 and 4 so as to uncover the support means 1 and all of the structure carried thereby, and in this way access may be had not only to a chamber for receiving the film spools or a film magazine, but also to all of the components of the camera carried by the support means 1, so that substantially the entire camera is accessible simply by removing the rear cap 10.

In accordance with the present invention a releasable lock means releasably locks the cap 10 in its closed position, and this releasable lock means includes a pair of lock levers 12 and 13 which have free ends 12a and 13a which extend into cutouts 14 and 15 of the cap 10 for holding the latter in its closed position. As is apparent particularly from FIG. 4, the upper and lower walls of the cap 10 respectively fixedly carry at their inner surfaces the plates 17 and 16, and it is these plates which are formed with the cutouts. Thus, the plate 16 is formed with the cutout 14 and the plate 17 is formed with the cutout 15, and these cutouts are of a substantially L-shaped configuration and have the portions 14a and 15a which extend transversely with respect to the direction of movement of the cap 10. The tips 12a and 13a of the lock levers 12 and 13 are respectively located in the transverse cutout portions 14a and 15a for locking the cap 10 in its closed position, and in order to release the cap 10 it is necessary for the levers 12 and 13 to be turned in directions which displace the tips 12a and 13a transversely to the direction of movement of the cap 10 out of the cutout portions 14a and 15a, and then the cap 10 can be removed in the direction of the arrow 11 shown in FIG. 3. The lever 12 is supported for turning movement by a pin 18 which is fixedly carried by a suitable bracket which is in turn carried by the frame 2, and a torsion spring 19 is coiled about the pin 18 and cooperates with the lever 12 for urging the latter to turn in a counterclockwise direction, as viewed in FIG. 4, so that the spring 19 urges the tip 12a into the locking cutout 14.

In the same way the locking lever 13 is supported for turning movement by a suitable pivot pin which also is carried by a bracket which is fixed to the frame 2, and a torsion spring 13' urges the lever 13 in a counterclockwise direction, as viewed in FIG. 4, to its locking position. Thus, in order to displace the levers 12 and 13 to positions which will release the cover 10 these levers 12 and 13 must be turned in clockwise directions, as viewed in FIG. 4, and the cap 4 carries projections which move with the cap 4 and which actuate the levers 12 and 13 for turning them in opposition to the springs 19 and 13' to positions releasing the cover or rear cap 10. Thus, the cap 4 fixedly carries a projection 20 and the lever 12 has distant from its tip 12a a portion located in the path of downward movement of the projection 20 so that when the cap 4 is moved downwardly from the operating position of FIG. 2 into the release position of FIG. 3 the projection 20 will engage the lever 12 and will turn it in a clockwise direction to a release position where the tip 12a is displaced out of the cutout portion 14a. The lever 13 carries an elongated wire member 21 which may pass around or be hooked onto a portion of the lever 13, and the lower end of the wire 21 is curved around one of the pins 5 which is carried by the cap 4, as described above, so that when the cap 4 is moved downwardly from the position of FIG. 2 into the position of FIG. 3 the upper pin 5 which is visible in FIG. 4 will displace the wire 21 downwardly so that the downward movement of this pin 5 will be transmitted through the wire 21 to the lever 13 for turning the latter in a clockwise direction so as to displace its tip 13a out of the transverse cutout portion 15a, and in this way the rear cap 10 is released at its upper portion for movement away from its closed position. As long as the cap 4 moves between the rest position of FIG. 1 and the operating position of FIG. 2 the upper pin 5 which is visible in FIG. 4 does not displace the wire 21 and the projection 20 does not turn the lever 12, so that in this range of movement of the cap 4 the lock means 12, 13 remains in its locking position holding the rear cap 10 in its closed position. It is only when the cap 4 is moved from its rest position through and beyond the operating position of FIG. 2 into the release position of FIG. 3 that the lock means will be displaced to a position releasing the cap 10 for movement in the direction of the arrow 11 of FIG. 3.

The structure of the invention also includes a releasable holding means for releasably holding the cap 4 in its operating position shown in FIG. 2, and this releasable holding means in the illustrated example takes the form of a lever 22 (FIG. 4) which is pivoted at its lower end to the lower end portion of the cap 4, this lower end of the lever 22 being received within the cap 4, and a spring 23 urges the lever 22 to turn in a clockwise direction, as viewed in FIG. 4. At its rear face the lever 22 is formed adjacent its upper end with an elongated horizontal slot 24, and when the cap 4 is displaced downwardly from the rest position of FIG. 1 into the operating position of FIG. 2 the front edge of the lower wall 10a of the rear cap 10 is received in the groove 24 so that in this way the lever 22 cooperates with this front edge of the lower wall 10 for releasably locking the cap 4 in the operating position of FIG. 2. The width of the lever 22 is, of course, less than the distance between the side walls of the rear cap 10 so that the upper free end of the lever 22 can move freely into the lower portion of the rear cap 10 when the front edge of the lower wall 10a thereof is received in the groove 24. Thus, the releasable holding means 22 will automatically cooperate with the front edge of the lower wall 10a of the rear cap 10 for releasably holding the cap 4 in its operating position of FIG. 2, and in this position of the cap 4 there is accessible through the opening 6 a button 25 which may be actuated by the operator for starting and stopping the operation of the camera. Instead of employing a front edge portion of the rear cap 10 to cooperate with the lever 22, it is also possible for the support means 1 to carry any suitable stationary member which will be received in the groove 24 for releasably holding the cap 4 in its operating position of FIG. 2.

In order to release the cap 4 for movement away from the position of FIG. 2 either into the release position of FIG. 3 or into the rest position of FIG. 1, it is necessary for the operator to turn the lever 22 in opposition to the spring 23 in a counterclockwise direction, as viewed in FIG. 4, so that upper end of the lever 22 will be displaced forwardly away from the front edge of the lower wall 10a of the rear cap 10, and this turning of the lever 22 is required to be performed manually by the operator so that the operator cannot fail to be aware of the fact that the front cap 4 is shifted away from its operating position. It will be noted that when the front cap 4 is in the rest position of FIG. 1 the lever 22 is not accessible, but when the front cap 4 is shifted downwardly from the rest position of FIG. 1 the lever 22 will be accessible to the operator behind the lower end portion of the cap 4 which now projects downwardly beyond the lower wall 10a, so that the operator need only engage the lever 22 behind the lower end portion of the cap 4 in order to turn the lever 22 for releasing the cap 4 for movement away from its operating position.

Figure 5:
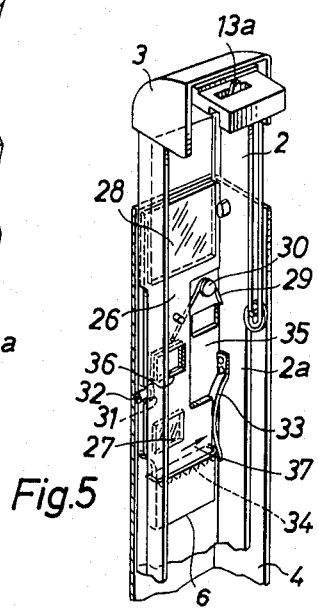
FIG. 5 is a fragmentary partly sectional perspective illustration of a filter assembly and structure for controlling the positioning thereof.

The structure of the invention also includes filters and structure for controlling these filters, and as may be seen from FIG. 5, this structure includes a carrier means 26 in the form of a plate which is vertically slidable within the frame 2. The carrier means or plate 26 carries a pair of filters such as a gray filter 27 for controlling the passage of light to the objective and a second gray filter 28 for controlling the passage of light through the opening 9 to the light-measuring structure. A spring 29 is mounted on a stationary pin 30 carried by the frame 2 and has a pair of free ends respectively engaging the frame 2, at a side wall 2a thereof, and a pin carried by the plate 26 for urging this plate 26 upwardly from the position of FIG. 5 into an operating position where the filters 27 and 28 are respectively aligned with the openings 7' and 9. A coupling means is provided for coupling the carrier means 26 to the cap 4 for movement therewith, and this coupling means includes a notch 31 formed in the left edge of the plate 26 and a pin 32 carried by the cap 4 and extending into the notch 31, so that since this pin 32 is fixed to the cap. 4 the carrier means 26 and the filters 27 and 28 therewith are necessarily constrained to move with the cap 4 as long as the pin 32 is in the notch 31. As is apparent from FIG. 5, the left side wall 2a of the frame 2 is formed with an elongated slot through which the pin 32 freely passes into the notch 31, and this slot is of course long enough to provide unrestricted movement of the cap 4 and the plate 26 therewith as long as the pin 32 is in the notch 31. A leaf spring 33 is fixed at one of its ends to the right side wall 2a of the frame 2, as viewed in FIG. 5, and this leaf spring 33 engages a right edge portion of the plate 26 for urging the latter to the left, as viewed in FIG. 5, so as to maintain the notch 31 in a position where the pin 32 is situated therein, and thus the spring 33 maintains the coupling means in an engaged position. The lower edge of the plate 26 is formed with an irregular surface 34 capable of being conveniently engaged by the operator, and it will be noted that this edge portion 34 of the plate 26 projects downwardly beyond the upper edge of the opening 6 of the front cap 4, as is apparent from FIG. 2, so that the plate 26 is accessible to the operator through the opening 6 at the lower, toothed edge 34 of the plate 26. When the front cap 4 is longitudinally displaced the carrier means 26 and the filters therewith will necessarily move with the cap 4 as long as the coupling means 31, 32 is engaged, and thus at this time when the cap 4 is displaced to its operating position shown in FIG. 2 from its rest position shown in FIG. 1 the filters 27 and 28 will be displaced from the openings 7' and 9 and will have no influence on the operation of the camera. The plate 26 is formed with openings 35 and 36 which are aligned with the openings 7 and 8 so that the operation of the objective and viewfinder are not influenced by the plate 26, and it will be noted that the opening 35 is elongated so that even when the plate 26 shifts upwardly the viewfinder still remains uninfluenced, the filters 27 and 28 cooperating only with the objective and exposure-controlling structure. In the event that it is desired to use the filters, then it is only necessary for the operator to engage the edge 34 and displace it in the direction of the arrow 37, shown in FIG. 5, in opposition to the spring 33, and this action will displace the notch 31 beyond the pin 32 so that the coupling means will be disengaged and the spring 29 will now immediately raise the carrier means 26 upwardly until the filter 28 is aligned with the opening 9 and of course the filter 27 will be aligned with the opening 7'. In this position of the carrier means 26 it is at precisely the same elevation as when the cap 4 is in its rest position shown in FIG. 1, so that when the cap 4 is returned to its rest position the spring 33 will automatically return the plate 26 to the left, as viewed in FIG. 5, moving the notch 31 over the pin 32 so that the latter will again be received in the notch 31 for reestablishing the engagement of the coupling means, and thus when the cap 4 is again moved down to its operating position the carrier means 26 will move downwardly therewith. Thus, it is only necessary to return the cap 4 to its rest position in order to reestablish the connection between the cap 4 and the carrier means 26.

In the embodiment of the invention which is illustrated in FIGS. 6 and 7, a single opening 10' is provided in the frame 2' of the support means for the passage of light both to the viewfinder and to the exposure-controlling structure. Thus, with this embodiment the front cap requires only an opening 38 which in the operating position of the front cap 4' shown in FIG. 6 is aligned with the objective 39, and in addition the front cap 4' is formed with an opening 40 giving access to a plate 41 which can be depressed by the operator, which is to say pushed rearwardly by a finger of the operator, for the purpose of starting the camera, the plate 41 returning to a position engaging the inner surface of the cap 4' in order to stop the operation of the camera, and these starting and stopping operations are effected in any suitable way well known in the art. Moreover, the opening 38 is made large enough so that it is possible to removably connect a front objective unit to the objective 39 which is permanently carried by the camera. It is also possible to connect cable release structure by connecting a conventional cable release either to the opening 41a in the plate 41 when it is desired to individually expose the frames so as to use the motion picture camera as a still camera, while the cable release can be connected through the opening 41b of the plate 41 to the camera for actuating the latter to make conventional motion pictures.

As may be seen from FIG. 7, a carrier means 26' in the form of a plate which is slidably guided by the frame 2' carries filters 27' and 28' which again may be gray filters, and a spring 42 is connected at its upper end to a pin 43 which is fixedly carried by the frame 2' while the lower end of the spring 42 is connected to a lower edge portion of the plate 26' so that the spring 42 urges the carrier means 26' and the filters 27' and 28' carried thereby upwardly to an operating position where the filter 27' will extend across the optical axis of the objective 39 and the filter 28' will be aligned with the opening through which light reaches the exposure-controlling structure. In order to guide the plate 26' for vertical movement, a guide means is provided, and this guide means includes a relatively long pin 43 of relatively small diameter which is received in an elongated vertical groove or slot portion 44 formed in the front wall of the frame 2' of the support means, as indicated in FIG. 7, while beneath the pin 43' the plate 26 carries a shorter pin 45 of a larger diameter, and this pin 45 is adapted to receive in the lower slot portion 46 which communicates at its upper end with the narrow slot portion 44 and which is substantially wider than the slot portion 44. The diameter of the pin 45 is such that it cannot move into the slot portion 44, so that when the pin 45 extends through the slot portion 46 it will engage the lower end of the slot portion 44 and will releasably retain the plate 26' and the filters carried thereby in a rest position where these filters are displaced beneath and out of alignment with the objective and the exposure-controlling structure. The plate 41 is located against the inner surface of the front cap 4' at the front wall thereof and it is spot-welded at 47 to the front cap 4' so that the plate 41 which is of a springy material can be deflected rearwardly at its upper portion which is accessible through the opening 40. A projection 41a of the plate 41 carries a free end portion 41b, and when the front cap 4' is in its operating position the elevation of the portions 41a and 41b of the plate 41 will be such that the deflection of the plate 41 by the operator will have no influence on the carrier means 26'.

However, if the front cap 4' is returned part of the way from the operating position of FIG. 6 back toward its rest position, the connection between the plate 41 and the camera starting structure will be broken in an unillustrated manner known in the art, and at a position intermediate its rest and operating positions the cap 4' will situate the plate 41 at such an elevation that when the operator depresses the plate 41, instead of starting the camera, the end portion 41b of the projection 41a will engage the pin 43' to displace the plate 26' rearwardly away from the frame 2', but this movement will continue only until the shorter pin 45 is displaced to the rear of the front wall of the frame 2' while the longer pin 43' will still remain in the slot 44. The tip of the end portion 41b engages only the free end of the pin 43', therefore as soon as the pin 45 has been displaced just to the rear of the bottom end of the narrower slot portion 44 the spring 42 will raise the plate 26' upwardly to place the filters 27' and 28' in their operating positions where they control the passage of light to the objective and the exposure-controlling structure. In this operating position of the carrier means 26' the carrier means and the filters have the same position which they have when the front cap 4' has been raised to its rest position. With the construction of FIGS. 6 and 7, however, a connection between the cap 4' and the carrier means 26' is not automatically reestablished when the cap 4' is returned to its upper, rest position. If the operator does not actuate the plate 41 and the cap 4' is again moved downwardly through its operating position shown in FIG. 6, the plate 26' will remain in its upper position. In order to return the plate 26' to its lower, inoperative position the operator must depress the plate 41 rearwardly while moving the cap 4' downwardly from its rest position, and now the projection 41b will extend over and will engage the pin 43' to move the carrier 26' downwardly with the cap 4' until the larger, but shorter pin 45 enters into the lower portion 46 of the slot so that the pin 45 can again engage the lower end of the narrow slot portion 44 to prevent the spring 42 from returning the plate 26' to its operating position. The plate 26' will remain in this inoperative position where the pin 45 extends through the slot portion 46 even if the operator returns the cap 4' to its rest position, it is necessary for the operator to actuate the plate 41 after the cap 4' has been raised to a position intermediate its operating and rest positions in order to move the plate 26 rearwardly through a distance sufficient to displace the pin 45 from the slot portion 46 so as to release the plate 26' to the spring 42. Therefore, with the embodiment of FIG. 7 the filter assembly will remain either in its inoperative or in its operative position while the operator moves the plate or cap 4', and in order to change the position of the filter assembly it is necessary for the operator to actuate the plate 41 in the manner described above.

While detailed embodiments of the invention have been described above, it is of course possible to vary these details without departing from the invention. For example, in the case of the embodiment of FIG. 5, instead of providing a releasable coupling means 31, 32 for coupling the carrier 26 to the cap 4 and a spring 29 for urging the filter assembly to its operating position, it is possible to reverse this arrangement and to provide instead a releasable coupling for holding the filter assembly in its operating position and a spring for returning the filter assembly to an inoperative position where it will move with the cap 4 when the coupling is disengaged.

It will be understood that each of the elements described above, or two or more together, may also find a useful application in other types of cameras differing from the types described above.

While the invention has been illustrated and described as embodied in motion picture cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera having a front and rear portion in combination, support means carrying components of the camera; a rear cap shiftably supported by said support means for movement to and from a closed position where said rear cap covers said rear portion of the camera, said rear cap being open only at a front end thereof which is located next to said front portion of the camera in the closed position of said rear cap and said rear cap being shiftable away from said closed position to uncover said support means and the components carried thereby; releasable lock means releasably locking said rear cap in said closed position thereof; and front cap means shiftably carried by said support means and covering said front portion and shiftable between two positions in one of which said front cap means prevents release of said lock means and in the other of which said front cap means permits release of said lock means.

2. In a camera having a front and rear portion, in combination, support means carrying components of the camera; a rear cap shiftably carried by said support means for movement to and from a closed position where said rear cap covers said rear portion of the camera, said rear cap being open only at a front end thereof which is located next to said front portion of the camera in said closed position of said rear cap; releasable lock means releasably locking said cap in said closed position thereof; and front cap means shiftably carried by said support means and substantially covering the front portion of the camera, said front cap means being shiftable between a rest position and an operating position and being shiftable beyond said operating position away from said rest position to a release position, said front cap means in said rest and operating positions preventing release of said lock means and said front cap means placing said lock means in a condition for releasing said rear cap only when said front cap means has been shifted to said release position.

3. In a camera having a front and rear portion, in combination, support means carrying components of the camera; a rear cap shiftably supported by said support means for movement to and from a closed position where said rear cap covers said rear portion of the camera, said rear cap being open only at a front end thereof which is located next to said front portion of the camera in the closed position of said rear cap and said rear cap being shiftable away from said closed position to uncover said support means and the components carried thereby; releasable lock means releasably locking said rear cap in said closed position thereof; and front cap means carried by said support means shiftable between two positions and covering said front portion and cooperating with said lock means to prevent the latter from being moved to a position unlocking said rear cap except when said front cap means has been displaced between said two positions.

4. In a camera having a front and rear portion, in combination, support means carrying components of the camera; a rear cap shiftably supported by said support means for movement to and from a closed position where said rear cap covers said rear portion of the camera, said rear cap having a front end which in the closed position of said rear cap is located adjacent to said front portion of the camera and said rear cap being open only at said front end thereof and being formed adjacent to said front end thereof with a cutout; a locking lever turnably carried by said support means and having a locking position located in part in said cutout to prevent movement of said rear cap away from said closed position thereof; spring means urging said lever to said locking position thereof; a front cap shiftably carried by said support means and covering said front portion of the camera, said front cap being shiftable between rest and operating positions and also being shiftable away from said rest position through and beyond said operating position to a release position, said front cap carrying a projection which is movable together with said front cap and said lever having a portion located in the path of movement of and engaged by said projection when said front cap is shifted to said release position to be moved by said projection to a position unlocking said rear cap.

5. In a camera as recited in claim 4, said cutout having a portion extending transversely to the direction of movement of said rear cap relative to said support means and said locking lever extending into said portion of said cutout for locking said cap in said closed position thereof.

6. In a camera having a front and rear portion, in combination, support means carrying components of the camera; a front cap shiftably carried by said support means at a front portion of the camera and covering said front portion of the camera, said front cap being shiftable between a rest position and an operating position; and releasable holding means releasably holding said front cap in said operating position thereof, said releasable holding means including a lever turnably carried by said front cap and formed with a groove, a member carried by said support means and received in said groove when said front cap is in said operating position thereof, and spring means urging said lever toward said member to receive the latter in said groove when said front cap is shifted to said operating position, said lever being accessible at the exterior of the camera to be moved by the operator away from said member for releasing said front cap for movement away from said operating position thereof.

7. In a camera having a front and rear portion, in combination, support means carrying components of the camera, said support means including a front frame; a rear cap shiftably carried by said support means for movement in a first direction to and from a closed position covering said rear portion of the camera; releasable lock means carried by said frame and engaging said rear cap in said closed position thereof for releasably locking said rear cap in said closed position thereof; and a front cap supported by said front frame and shiftable in a second direction substantially transverse to said first direction between a rest position in which said front cap covers said front portion of the camera and an operating position in which said front cap at least partly uncovers said front portion of the camera.

8. In a camera having a front and rear portion, in combination, support means carrying components of the camera; a rear cap shiftably carried by said support means for movement in a first direction to and from a closed position where said rear cap covers said rear portion of the camera; a corner cap carried by said support means at an end of said front portion thereof and forming a stop for said rear cap to determine the closed position thereof; and a front cap shiftably carried by said support means at said front portion of the camera for movement in a second direction transverse to said first direction to and from a position engaging said corner cap so that the latter also acts as a stop for said front cap, said front cap having a rear edge portion extending along said rear cap when the latter is in said closed position thereof.

9. In a camera having a front and rear portion, in combination, support means carrying components of the camera, said support means having at a front portion of the camera an elongated channel-shaped frame formed with openings for an objective having an optical axis, a viewfinder, and a light-measuring structure of the camera; a rear cap shiftably carried by said support means for movement in a first direction substantially parallel to said optical axis to and from a closed position covering said rear portion of the camera; and a front cap also of channel-shaped configuration receiving said frame in its interior and shiftably carried by said frame, said front cap being shiftable in a second direction perpendicular to said first direction to and from an operating postion and having openings which are respectively aligned with said openings of said frame only when said front cap is in said operating position thereof.

10. In a camera, in combination, support means supporting components of the camera, said support means having a front portion formed with openings for an objective of the camera and for the passage of light to a light-measuring assembly; filter means for covering said openings; carrier means carrying said filter means; and front cap means shiftably carried by said support means at said front portion thereof and operatively connected to said carrier means, said carrier means including manually operable means for controlling the position thereof with respect to said front cap means so as to control the position of said filter means relative to said openings.

11. In a camera, in combination, support means; filter means; carrier means carrying said filter means; spring means operatively connected to said support means and to said carrier means for urging the latter to an operating position where said filter means is aligned with a part of the camera to control the passage of light through said part of the camera; a front cap shiftably carried by said support means; releasable coupling means coupling said carrier means to said front cap for shiftable movement therewith; and manually operable means adapted to release said coupling means and thereby said carrier means whereby the latter is moved by said spring means to said operating position.

12. In a camera, in combination, support means; filter means; carrier means carrying said filter means; spring means operatively connected to said support means and to said carrier means for urging the latter to an operating position where said filter means is aligned with a part of the camera to control the passage of light through said part of the camera; a front cap shiftably carried by said support means; and releasable coupling means coupling said carrier means to said front cap for shiftable movement therewith, said coupling means including a portion of said carrier means which is formed with a cutout and a pin carried by said front cap and located in said cutout to couple said carrier means to said front cap for movement therewith, said carrier means having a portion which is accessible to the operator for movement by the operator to a position where said cutout is displaced from said pin to release said carrier means to said spring means to be moved by the latter to said operating position.

13. In a camera, in combination, support means; filter means; carrier means carrying said filter means; spring means operatively connected to said support means and to said carrier means for urging the latter to an operating position where said filter means is aligned with a part of the camera to control the passage of light through said part of the camera; a front cap shiftably carried by said support means; and releasable coupling means coupling said carrier means to said front cap for shiftable movement therewith, said coupling means including a portion of said carrier means which is formed with a cutout and a pin carried by said front cap and located in said cutout to couple said carrier means to said front cap for movement therewith, said carrier means having a portion which is accessible to the operator for movement by the operator to a position where said cutout is displaced from said pin to release said carrier means to said spring means to be moved by the latter to said operating position, said front cap having an opening through which a camera release member is accessible for stopping and starting the operation of the camera when the front cap has been shifted on said support means to a given position, and said carrier means having an edge portion accessible through said opening of said cap for displacing said carrier means to displace said cutout from said pin.

14. In a camera, in combination, support means for carrying components of the camera, filter means for controlling the passage of light into the camera; carrier means carrying said filter means; a front cap shiftably carried by said support means at a front portion of the camera; spring means urging said carrier means to an operating position where said filter means controls the passage of light into a part of the camera; releasable holding means releasably holding said carrier means in an inoperative position where said filter means does not control the passage of light into the camera; and manually operable means carried by said front cap for actuating said releasable holding means to release said carrier means to said spring means to be moved thereby to said operating position.

15. In a camera, in combination, support means for carrying components of the camera; filter means for controlling the passage of light into the camera; carrier means carrying said filter means; a front cap shiftably carried by said support means at a front portion of the camera; spring means urging said carrier means to an operating position where said filter means controls the passage of light into a part of the camera; releasable holding means releasably holding said carrier means in an inoperative position where said filter means does not control the passage of light into the camera; and manually operable means carried by said front cap for actuating said releasable holding means to release said carrier means to said spring means to be moved thereby to said operating position, said releasable holding means including a pin located in the path of movement of a portion of said manually operable means to be engaged by the latter and to be displaced to a position releasing said carrier means to said spring means.

16. In a camera, in combination, support means for carrying components of the camera; a front cap carried by said support means at a front portion of the camera for shiftable movement between a rest position and an operating position where exposures will be made; filter means; carrier means carrying said filter means; spring means urging said carrier means to an operating position where said filter means controls the passage of light into the camera; a pin carried by said carrier means; and manually operable means carried by said cap for starting and stopping the camera, said manually operable means having a projection which when said manually operable means is actuated and said cap is shifted to its operating position engages said pin to draw said carrier means in opposition to said spring means to a position displacing said filter means from a location where it controls the passage of light.

17. In a camera, in combination, support means having an elongated front frame, said support means supporting components of the camera and said frame being formed with an elongated slot having a lower portion wider than an elongated upper portion thereof; carrier means guided for movement by said frame and having a pair of pins one of which has a greater cross section than the other to be located in the wider lower portion of said slot and the other of which is movable along the upper portion of the slot and has a longer length than said one pin; filter means carried by said carrier means; spring means urging said carrier means to an operating position where said filter means controls the passage of light into the camera; and a front cap slidable on said frame and including a manually operable member which is actuated to start and stop the camera and which has a projection which, when said manually operable member is actuated when said cap is in a given position, engages said other pin to displace said carrier means away from said frame a distance sufficient to displace said larger pin out of said lower wider portion of said slot to release said carrier means to said spring means which then automatically shifts said carrier means to its operating position while guided by the cooperation of said longer pin with said upper portion of said slot.

References Cited by the Examiner

UNITED STATES PATENTS

| | | | |
|---|---|---|---|
| 2,420,628 | 5/1947 | Stoiber | 95—31 |
| 2,495,223 | 1/1950 | Bodlander | 95—11 |
| 2,674,166 | 4/1954 | Sochol | 95—34 |

JOHN M. HORAN, *Primary Examiner.*